(12) United States Patent
Kawakami et al.

(10) Patent No.: US 6,561,551 B2
(45) Date of Patent: May 13, 2003

(54) PIPE COUPLING

(75) Inventors: Yoshimichi Kawakami, Tokyo (JP); Yukio Namekawa, Tokyo (JP)

(73) Assignee: Nitto Kohki Co., Ltd. (JP)

( * ) Notice: Subject to any disclaimer, the term of this patent is extended or adjusted under 35 U.S.C. 154(b) by 0 days.

(21) Appl. No.: 10/109,071

(22) Filed: Mar. 28, 2002

(65) Prior Publication Data

US 2002/0140227 A1 Oct. 3, 2002

(30) Foreign Application Priority Data

Mar. 29, 2001 (JP) ........................................ 2001-094517

(51) Int. Cl.$^7$ ................................................ F16L 37/28
(52) U.S. Cl. ........................... 285/316; 285/81; 285/86; 285/307
(58) Field of Search ......................... 285/23, 81, 84, 285/85, 86, 307, 316

(56) References Cited

U.S. PATENT DOCUMENTS

| | | | | |
|---|---|---|---|---|
| 2,536,702 A | * | 1/1951 | Scheiwer | 251/149.7 |
| 3,613,726 A | * | 10/1971 | Torres | 137/614.03 |
| 4,114,853 A | * | 9/1978 | Medvick | 251/149.6 |
| 4,583,711 A | * | 4/1986 | Johnson | 137/614 |
| 4,682,795 A | * | 7/1987 | Rabushka et al. | 285/1 |
| 5,092,364 A | * | 3/1992 | Mullins | 137/614.05 |
| 5,323,812 A | * | 6/1994 | Wayne | 137/614.03 |
| 5,390,963 A | * | 2/1995 | Namekawa | 285/316 |
| 5,445,358 A | * | 8/1995 | Anderson | 251/149.6 |
| 6,039,303 A | * | 3/2000 | Danielson et al. | 137/614.03 |
| 6,129,334 A | * | 10/2000 | Kuwabara | 251/149.1 |

FOREIGN PATENT DOCUMENTS

JP 7-12693 3/1995

* cited by examiner

Primary Examiner—Eric K. Nicholson
(74) Attorney, Agent, or Firm—Pennie & Edmonds LLP

(57) ABSTRACT

A pipe coupling comprising a socket having a plurality of locking balls capable of engaging a locking portion on a plug and connected to the plug with the locking balls in engagement with the locking portion. The socket includes a main cylinder having an end portion formed with an inlet to receive the plug and an outer cylinder located close to the end portion of the main cylinder and around the outer periphery thereof. The main cylinder and the outer cylinder define a gap having a tapered profile between them, and the locking balls are stored in the gap. The locking balls can project and recede from the inner periphery of the main cylinder. Further, the pipe coupling comprises a thrust cylinder slidable on the outer periphery of the main cylinder. When the locking balls engage the locking portion, the thrust cylinder prevents centrifugal movement of the locking balls.

10 Claims, 5 Drawing Sheets

PIPE COUPLING

CROSS-REFERENCE TO RELATED APPLICATIONS

This application is based upon and claims the benefit of priority from the prior Japanese Patent Application No. 2001-094517, filed Mar. 29, 2001, the entire contents of which are incorporated herein by reference.

BACKGROUND OF THE INVENTION

1. Field of the Invention

The present invention relates to a pipe coupling having a socket capable of being attached to and detached from a mating plug, and more particularly, to a pipe coupling adapted to connect pipe lines for pressurized fluids.

2. Description of the Related Art

There has conventionally been developed a pipe coupling that is provided with a locking mechanism for locking a socket connected to a mating plug. Usually, the socket of the pipe coupling of this type has a series of tapered holes that are arranged at circumferential spaces near its plug inlet. A plurality of locking balls are stored in the tapered holes. Further, the socket is provided with an operating ring, which is slidable between a locked position in which the locking balls are urged radially inward and an unlocked position in which the balls can move radially outward. The operating ring is urged toward the locked position by means of a spring. On the other hand, the body of the mating plug has a locking groove that receives the locking balls.

When one end of the plug is in the plug inlet of the socket, the operating ring of the socket restrains the locking balls from moving centrifugally, thereby keeping the balls in engagement with the locking groove of the plug. Thereupon, the socket and the plug are locked lest they separate from each other. In separating the socket and the plug from each other, the operating ring of the socket is slid. By doing this, the locking balls of the socket are allowed to move centrifugally from the locking groove of the plug, whereupon the socket and the plug are unlocked. In the case where the socket or the plug is provided with a valve, the valve can be opened or closed automatically as the socket and the plug are connected to or separated from each other.

In operation, the pipe coupling constructed in this manner is subjected to a force of pressure from a fluid that flows therethrough and urges the socket and the plug to separate from each other. This force acts as a contact pressure on the respective engaging surfaces of the locking groove of the plug and the locking balls of the socket. If the pressure of the fluid is low, the force never adversely affects the pipe coupling.

If the fluid pressure increases, however, the aforesaid force becomes very high. If the pipe coupling is used in a high-pressure pipe line system in which the fluid pressure is as high as 35 MPa or more, for example, the contact pressure that acts on the locking balls is so high that the pressure-side edge of the locking groove of the plug body undergoes a sag (plastic deformation caused by the high contact pressure on the locking balls). In the worst case, the sag of the locking groove hinders the slide of the operating ring, thereby disabling the socket and the plug from being attached to or detached from each other.

In order to prevent the sag of the locking groove, the contact pressure that acts on each locking ball should be lowered by loading the socket with a large number of balls. To attain this, however, a large number of tapered holes for locking ball retention must be formed in the socket. In consequence, the space between each two adjacent tapered holes is inadequate, thus the strength of the locking ball retaining portion of the socket lowers inevitably. Thus, the number of locking balls can be increased only limitedly.

In consideration of the above, the assignee of the present invention proposed a pipe coupling that can satisfactorily cope with pipe lines in which a pressurized fluid circulates (Jpn. UM Appln. KOKAI Publication No. 7-12693). In this pipe coupling, a socket is provided with first and second rows of locking members (locking balls), while the outer peripheral surface of a plug is formed having first and second locking grooves. The socket and the plug can be locked together in a manner such that the locking members in each row are caused to engage their corresponding locking groove and that the movement of the locking members is restrained by means of an operating ring. With this configuration, the contact pressure that acts on the locking members can be dispersed to prevent the locking grooves of the plug body from sagging. Thus, the socket body and the plug body can be securely attached to and detached from each other.

Since the pipe coupling has a plurality of rows of locking members, it is inevitably long and complicated. In consequence, it cannot be easily reduced in size and weight and entails an increase in cost.

BRIEF SUMMARY OF THE INVENTION

The principal object of the present invention is to provide a small-sized, low-priced pipe coupling, capable of reducing the load that acts on each locking ball even when a compressed fluid circulates therein.

According to the present invention, there is provided a pipe coupling that comprises a socket. The socket has a plurality of locking balls capable of engaging a locking portion on a plug and connected to the plug with the locking balls in engagement with the locking portion of the plug. The socket further includes: a main cylinder having an outer peripheral surface, an inner peripheral surface, and an end portion formed with an inlet capable of receiving the plug; an outer cylinder located close to the end portion of the main cylinder and around the outer peripheral surface thereof with a fixed annular space defined between the outer cylinder and the outer peripheral surface, the end portion of the main cylinder and the inner end portion of the outer cylinder forming a gap having a tapered profile, each of the locking balls being stored in the gap and movable between a position in which the ball projects radially inward from the inner peripheral surface of the main cylinder and a position in which the ball is recessed from the inner peripheral surface; and a thrust cylinder slidably located in the space between the main cylinder and the outer cylinder and urged toward the end portion, the plug being adapted to be prevented from separating from the socket in a manner such that centrifugal movement of the locking balls is prevented by means of the thrust cylinder when the locking balls are situated in the projected position and in engagement with the locking portion of the plug.

According to this pipe coupling, the socket has no holes for holding the locking balls, and the locking balls are stored in the gap existing between the main cylinder and the outer cylinder. Although the locking balls are arranged in a row in the circumferential direction, as in the conventional case, therefore, a pressing load that acts on each locking ball can be lightened considerably, and the resulting pipe coupling can withstand high pressure fluid contained therein (e.g., internal pressure of 500 MPa). Since the locking balls are arranged in a row, moreover, the overall length of the pipe coupling can be made equal to that of a conventional one, and the combining operation for the locking balls is easy.

BRIEF DESCRIPTION OF THE SEVERAL VIEWS OF THE DRAWING

The other objects, features, and advantages of the invention will be more apparent from the following description, read in connection with the accompanying drawings, in which:

FIGS. 5A to 5C are views for illustrating the function of the locking balls, in which FIG. 5A shows the plug in an unlocked state, and FIGS. 5B and 5C show the plug in a locked state;

DETAILED DESCRIPTION OF THE INVENTION

Figure 1:
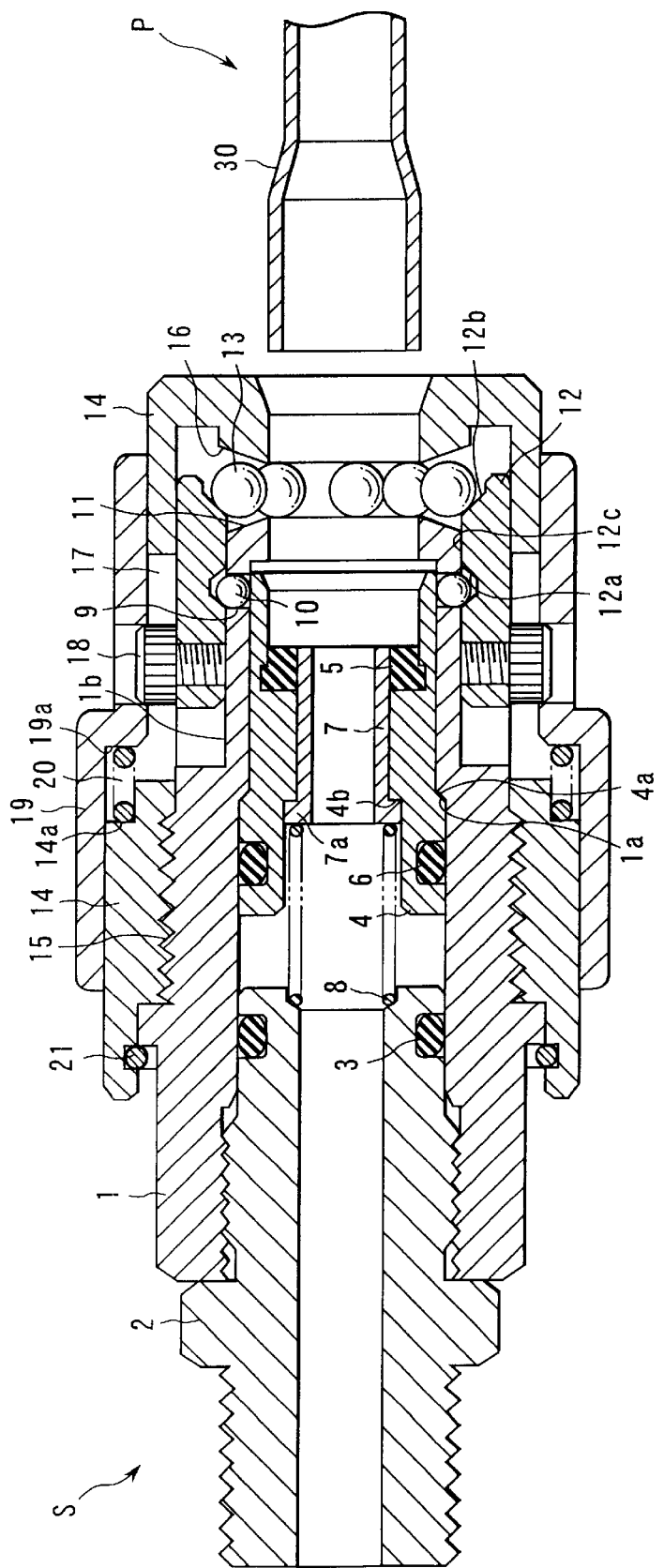
FIG. 1 is a sectional view showing a state in which a socket of a pipe coupling according to a preferred embodiment of the invention and a plug are separate from each other, the plug being formed of a molded pipe.

In a pipe coupling according to a preferred embodiment of the present invention shown in FIG. 1, a socket S comprises a main cylinder 1 and an inner cylinder 2 that is screwed into one end of the main cylinder and can be connected to a hose or the like. The main cylinder 1 has an inlet at its other end, that is, at the end portion on the right-hand side of FIG. 1, and can receive a plug P through this inlet. A seal member 3 for sealing the gap between the inner peripheral surface of the main cylinder 1 and the outer peripheral surface of the inner cylinder 2 is provided on the main cylinder 1.

A sleeve/seal retainer 4 is slidably fitted in the main cylinder 1. The seal retainer 4 is prevented from moving to the right of FIG. 1 when a step portion 4a on the outer periphery of the retainer 4 engages a step portion 1a on the inner peripheral surface of the main cylinder 1. A gasket 5 for liquid-tightly sealing the plug P is fitted in the plugging-side end portion of the seal retainer 4. Further, a seal member 6 for sealing the gap between the outer peripheral surface of the seal retainer 4 and the inner peripheral surface of the main cylinder 1 is provided on the retainer 4. The inner peripheral surface of the gasket 5 is held by means of a spring seat 7 that is fitted in the seal retainer 4. An urging member (coil spring) 8 for urging the seal retainer 4 to the right of FIG. 1 is interposed between the spring seat 7 and the inner cylinder 2. The spring seat 7 has a collar 7a. As the collar 7a engages a step portion 4b of the seal retainer 4, the spring seat 7 is prevented from slipping out of the retainer 4.

A small-diameter step portion 1b is formed on the outer periphery of the main cylinder 1. The step portion 1b has a plurality of tapered radial holes 9 that are arranged in the circumferential direction. Each radial hole 9 is tapered centripetally. Retaining balls 10 are located individually in the holes 9 and serve as stopper means for preventing axial movement of a thrust cylinder 12 (mentioned later). To attain this, each retaining ball 10 has a diameter greater than the axial dimension of each hole 9, and is movable between a position in which it partially projects from the inner peripheral surface of the main cylinder 1 and a position in which it is recessed from the inner peripheral surface and projects from the outer peripheral surface of main cylinder 1. Further, the distal end portion of the main cylinder 1 on the plug-inlet side is thick-walled. The thickness of the thick-walled portion is smaller than the diameter of each of locking balls 13 (mentioned later), and its distal end face is formed as a taper 11 for holding the balls 13 in a manner mentioned later.

The thrust cylinder 12 is slidably located on the outer periphery of the small-diameter step portion 1b of the main cylinder 1. The inner peripheral surface of the thrust cylinder 12 is formed having a groove 12a that allows the retaining balls 10 to move centripetally. Further, the distal end portion of the thrust cylinder 12 on the inner peripheral side is formed having a taper 12b that allows the locking balls 13 to move centrifugally. Furthermore, the inner peripheral surface portion between the groove 12a and the taper 12b is formed having a thrust surface 12c that presses the balls 13 centripetally.

An outer cylinder 14 is fixed on the outer peripheral portion that adjoins the small-diameter step portion 1b. In the present embodiment, the outer cylinder 14 is fixed to the main cylinder 1 in a manner such that an internal thread 15 on the inner peripheral surface of the outer cylinder 14 is screwed on an external thread on the outer peripheral portion of the main cylinder 1. The plugging-side end portion of the outer cylinder 14 is formed having an inner flange that has an inside diameter substantially equal to that of the distal end portion of the main cylinder 1. The inner peripheral side edge of the inner flange is formed having a taper 16 that faces the taper 11 on the main cylinder 1.

Figure 2:
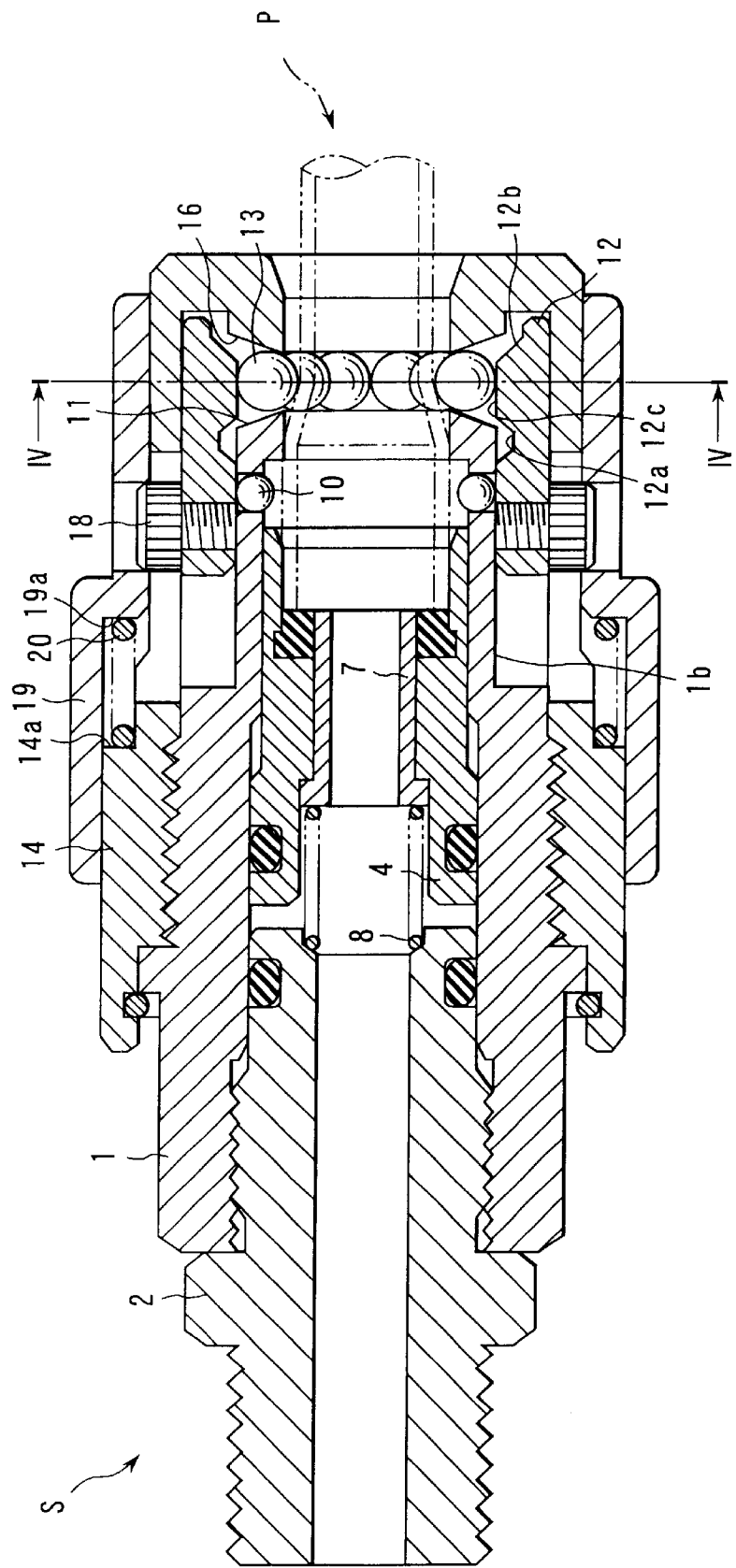
FIG. 2 is a sectional view showing the socket and the plug of FIG. 1 in a connected state.
Figure 3:
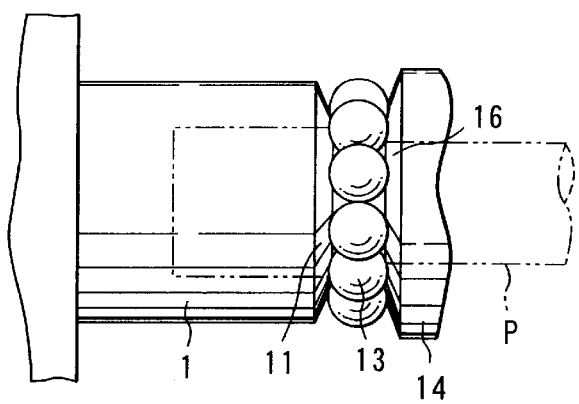
FIG. 3 is a partial view of the socket of FIG. 1 showing the arrangement of the locking balls are arranged when the plug and socket are connected.
Figure 4:
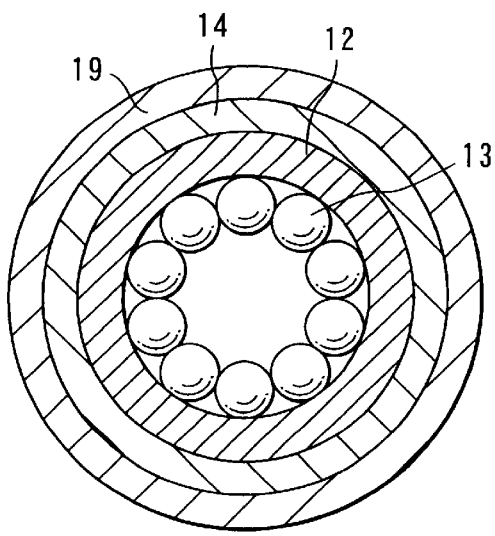
FIG. 4 is a sectional view taken along line A—A of FIG. 2.
Figure 5A:
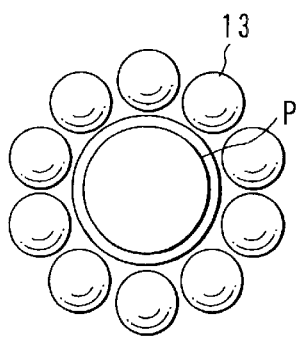
Figure 5B:
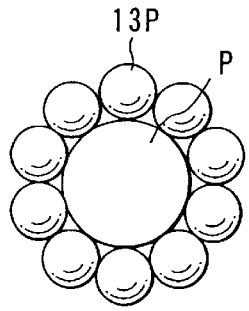
Figure 5C:
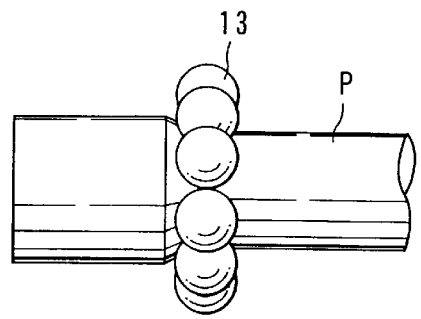

As shown in FIGS. 1 to 3, the taper 16 forms a ball retaining portion that cooperates with the taper 11 of the main cylinder 1 to hold the locking balls 13. The ball retaining portion includes a gap or annular groove with a tapered profile that is defined between the two opposite tapers 11 and 16 and has its width reduced centripetally. The width of the innermost peripheral portion of the annular groove is smaller than the diameter of each locking ball 13. Since the thickness of the distal end portion of the main cylinder 1 is smaller than the diameter of each locking ball 13, as mentioned before, moreover, the depth of the annular groove is also smaller than the diameter of each ball 13. As shown in FIGS. 3 and 4, therefore, the locking balls 13 in the annular groove of the ball retaining portion can individually freely move in the radial direction of the main cylinder 1 between the position in which they project from the inner peripheral surface of the cylinder 1 and the position in which they are recessed from it. Preferably, the number of locking balls 13 stored in the annular groove should be decided so as to meet the following conditions. When the socket S and the plug P are separate from each other, gaps are formed between the adjacent locking balls 13 to allow the insertion of the plug P, as shown in FIG. 5A. When the socket S and the plug P are connected, the adjacent balls 13 are pushed centripetally to be brought intimately into contact with one another by the thrust cylinder 12, so that they engage the outer periphery of a locking portion 30, which is formed of a taper of the plug P, thereby locking the plug P throughout its circumference, as shown in FIGS. 5B and 5C.

Figure 6:
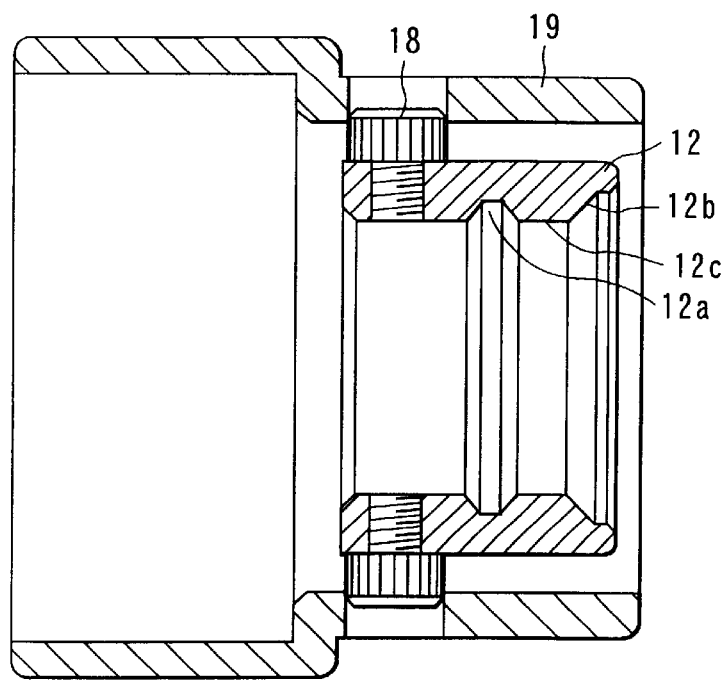
FIG. 6 is a sectional view showing an operating ring and a thrust cylinder of the socket shown in FIG. 1.
Figure 7:
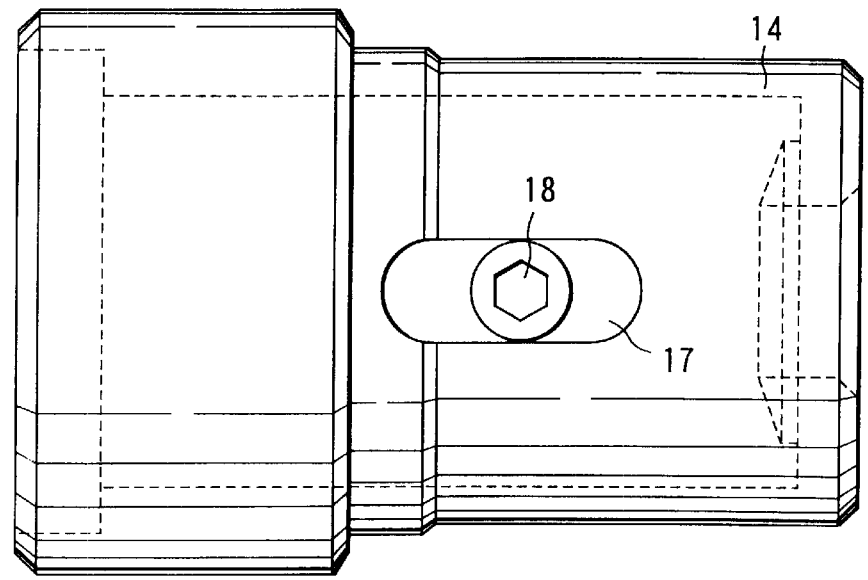
FIG. 7 is a plan view of an outer cylinder of the socket shown in FIG. 1.

As shown in FIG. 7, the outer cylinder 14 has a plurality of slots 17 that extend in the axial direction of the socket S. As shown in FIG. 1, one end of a coupler (screw) 18, which is attached to the thrust cylinder 12, penetrates each slot 17 so as to be movable therein. The head portion of each coupler 18 that projects from its corresponding slot 17 of the outer cylinder 14 is coupled to an operating ring 19, which is slidably fitted on the cylinder 14, as shown in FIG. 6, and can be handled by an operator. Further, an urger (coil spring) 20 for urging the operating ring 19 to the right of FIG. 1 is interposed between the ring 19 and the outer cylinder 14. The urger 20 is located between a step portion 14a on the outer periphery of the outer cylinder 14 and a step portion 19a on the inner periphery of the operating ring 19. The urger 20 normally urges the ring 19 to the right of FIG. 1. In FIG. 1, numeral 21 denotes a stop ring that serves to fix the outer cylinder 14 to the main cylinder 1.

The following is a description of the operation for connecting the socket S and the plug P constructed in this manner.

When the socket S and the plug P are separate from each other (in the state shown in FIG. 1), the outer peripheral surface of the seal retainer 4 centrifugally pushes out the retaining balls 10. Thereupon, the balls 10 enter the groove 12a in the inner peripheral surface of the thrust cylinder 12, thereby preventing the cylinder 12 from moving in the axial direction. In this state, the couplers 18 and the operating ring 19 maintain the urger 20 in a compressed state. Further, the locking balls 13 can move centrifugally along the taper 12b of the thrust cylinder 12 or the taper 16 of the outer cylinder 14.

If the plug P is inserted into the socket S through its inlet when the socket S is in the state of FIG. 1, an end portion of the plug pushes the locking balls 13, whereupon the balls 13 are moved radially outward in the circumferential groove between the tapers 11 and 16. If the end portion of the plug P is further inserted into the socket S beyond the locking balls 13, it abuts against the gasket 5 of the seal retainer 4. If the plug P is further pushed in, the seal retainer 4 moves to the left of FIG. 1 compressing the spring 8, so that the retaining balls 10 are disengaged from the outer peripheral surface of the retainer 4. Thereupon, the balls 10 move centripetally from the groove 12a in the inner peripheral surface of the thrust cylinder 12, so that the cylinder 12 is allowed to move in the axial direction. The urging force of the urger 20 that acts on the operating ring 19 also acts on the cylinder 12 via the couplers 18. Accordingly, the thrust cylinder 12, along with the ring 19, is urged to the right of FIG. 1, so that the taper 12b of the cylinder 12 urges the locking balls 13 to move centripetally.

When the locking balls 13 engage the taper or the locking portion 30 of the plug P, they move centripetally along the outer peripheral surface of the locking portion 30. At the same time, the thrust cylinder 12 moves to the right of FIG. 1. The thrust surface 12c on the inner peripheral surface of the thrust cylinder 12 pushes in the locking balls 13 centripetally, so that the balls 13 press the locking portion 30 of the plug P. Thereupon, the plug P is locked in the socket S to establish the connected state of the pipe coupling shown in FIG. 2.

In separating the socket S and the plug P in the connected state of FIG. 2 from each other, the operating ring 19 is moved to the left of FIG. 2, resisting the urging force of the urger 20. Instead of the thrust surface 12c of the thrust cylinder 12, the taper 12b is located outside the locking balls 13, while the groove 12a is situated outside the retaining balls 10. Thereupon, the balls 13 are allowed to move centrifugally, so that the plug P can be easily drawn out of the socket S. If the plug P is drawn out, the seal retainer 4 is moved to the right of FIG. 2 by means of the urging force of the urging member 8. The outer peripheral surface of the retainer 4 pushes the retaining balls 10 centrifugally into the groove 12a of the thrust cylinder 12. Thereupon, the socket S is restored to the separated state of FIG. 1.

In the connected state shown in FIG. 2, according to the pipe coupling described above, the locking balls 13 are intimately in contact with one another as they are held by means of the ball retaining portion of the socket S and engage the locking portion 30 of the plug P. Thus, all the locking balls 13 form a very large area of contact with the socket S and the plug P. Accordingly, a load that acts on each locking ball 13 can be made much lighter than in the conventional case, and the resulting pipe coupling can resist a high internal pressure (e.g., internal pressure of 500 MPa). Further, the internal pressure causes the plug P to disperse the centrifugal force that acts on the locking balls 13 and the thrust cylinder 12, so that no substantial force acts locally. Since only one row of locking balls 13 extend in the circumferential direction, the overall length of the pipe coupling including the socket S can be made equal to that of the conventional pipe coupling.

Since the locking balls 13 are stored in one annular groove that is defined by the ball retaining portion or the tapers 11 and 16, moreover, the combining operation can be facilitated without requiring independent storage of the locking balls in separate radial holes, which is essential in the conventional case. Since the locking balls 13 that are thus stored in the one annular groove can freely move in the annular groove, they are not constantly fixed in one position. Thus, the respective positions of engagement of the locking balls 13 with the ball retaining portion of the socket S is not fixed. Accordingly, stress on the socket can be reduced, so that its working life can be lengthened.

Figure 8:
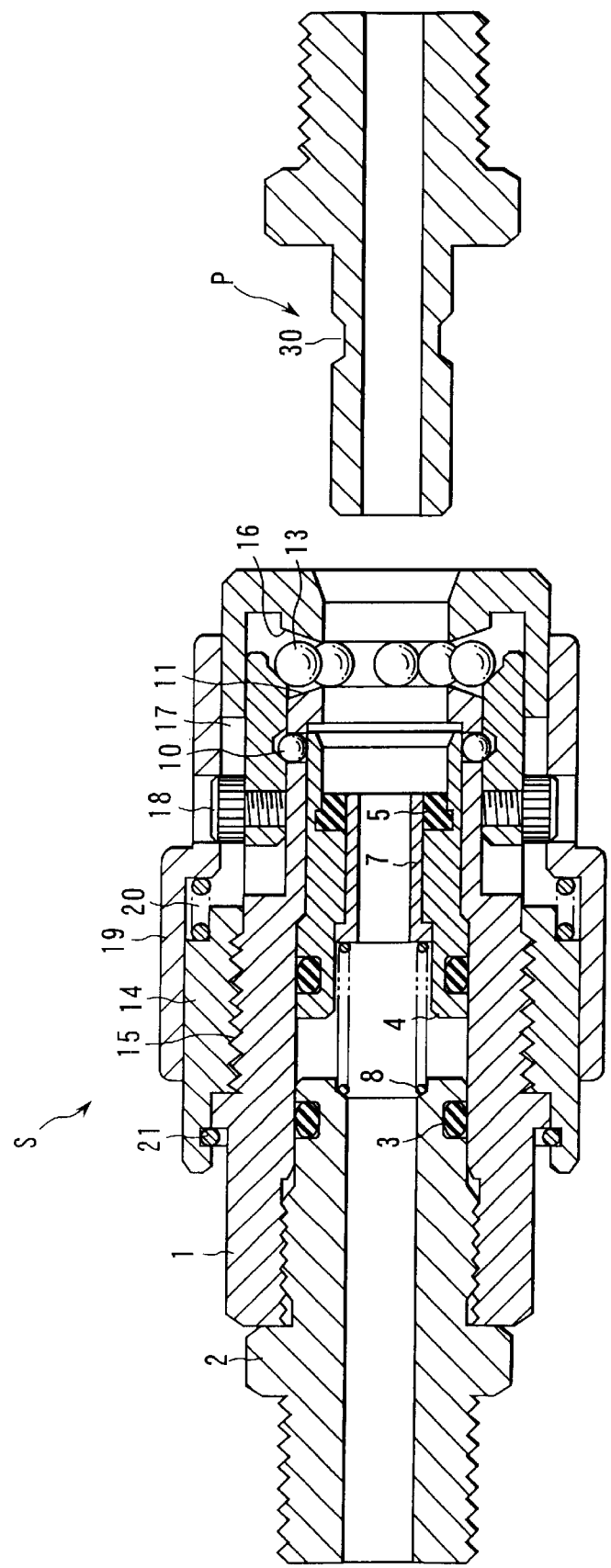
FIG. 8 is a sectional view similar to FIG. 1, showing a state in which a socket and a plug are separate from each other, the plug being of the conventional type.

The thrust cylinder 12 and the operating ring 19 may be formed as an integral structure instead of being formed of separate members. In this case, the thrust cylinder may possibly be urged toward the plugging side by means of a coil or plate spring. Further, the urger 20 and the urging member 8 that urge the operating ring 19 and the seal retainer 4, respectively, can be located individually in any other suitable positions than the aforesaid positions, provided that the same functions can be fulfilled. Furthermore, the plug P is not limited to the one shown in FIG. 1, which is formed of a molded pipe, and may be selected from various other structures including the conventional plug shown in FIG. 8, provided it can fulfill the function of a plug. In FIGS. 1 and 8, like numerals refer to the same members.

The present invention is not limited to the embodiment described above, and that various changes and modifications may be effected therein by one skilled in the art without departing from the scope or spirit of the invention. Therefore, the above-described embodiment is given by way of illustration only, and thus, is not limitative of the invention.

What is claimed is:

1. A pipe coupling comprising a socket having a plurality of locking balls capable of engaging a locking portion on a plug and connected to the plug with the locking balls in engagement with the locking portion of the plug, the socket comprising:

a main cylinder having an outer peripheral surface, an inner peripheral surface, and an end portion formed with an inlet capable of receiving the plug;

an outer cylinder located close to the end portion of the main cylinder and around the outer peripheral surface thereof with a fixed annular space defined between the outer cylinder and the outer peripheral surface and having an inner end portion formed on an inner side of the outer cylinder, the end portion of the main cylinder and the inner end portion of the outer cylinder forming a gap having a tapered profile and extending over an entire circumference, each of the locking balls being stored in the gap and movable between a position in which the ball projects radially inward from the inner peripheral surface of the main cylinder and a position in which the ball is recessed from the inner peripheral surface; and a thrust cylinder slidably located in the space between the main cylinder and the outer cylinder and urged toward the end portion, the plug being adapted to be prevented from separating from the socket in a manner such that centrifugal movement of the locking balls is prevented by means of the thrust cylinder when the locking balls are situated in the projected position and in engagement with the locking portion of the plug.

2. A pipe coupling according to claim 1, which further comprises an operating ring slidably fitted on the outer peripheral surface of the outer cylinder and accessible to an operator and an urger for urging the operating ring toward the end portion, the operating ring being coupled to the thrust cylinder and capable of transmitting the urging force of the urger to the thrust cylinder.

3. A pipe coupling according to claim 1, wherein said gap is an annular groove.

4. A pipe coupling according to claim 1, which further comprises stopper means for engaging and preventing the thrust cylinder from moving toward the end portion when the plug is not inserted in the inlet, the stopper means being constructed to disengage the thrust cylinder when the plug is inserted into the inlet.

5. A pipe coupling according to claim 4, wherein said main cylinder has a plurality of radial holes arranged at spaces in the circumferential direction and reduced in diameter in the centripetal direction, the stopper means including retaining balls movably stored in the radial holes, the retaining balls being adapted to project from the outer peripheral surface of the main cylinder and engage the thrust cylinder when the plug is not inserted in the inlet and to be recessed from the outer peripheral surface and disengage the thrust cylinder when the plug is inserted.

6. A pipe coupling according to claim 5, which further comprises a seal retainer slidably stored in the main cylinder and adapted to press the retaining balls in the centrifugal direction when the plug is not inserted in the inlet and to release the retaining balls from the press when the plug is inserted.

7. A pipe coupling according to claim 6, wherein said end portion of said main cylinder has a thick-walled portion, and said radial holes are formed in positions near the thick-walled portion.

8. A pipe coupling according to claim 1, wherein said outer cylinder has a flange portion extending in the centripetal direction, and said gap is defined between the inner peripheral side edge portion of the flange portion and the end portion of the main cylinder.

9. A pipe coupling according to claim 1, wherein said plug is formed from a pipe.

10. A socket having a plurality of locking balls capable of engaging a locking portion on a plug and connected to the plug with the locking balls in engagement with the locking portion of the plug, the socket comprising:

a main cylinder having an outer peripheral surface, an inner peripheral surface, and an end portion formed with an inlet capable of receiving the plug;

an outer cylinder located close to the end portion of the main cylinder and around the outer peripheral surface thereof with a fixed annular space defined between the outer cylinder and the outer peripheral surface and having an inner end portion formed on an inner side of the outer cylinder, the end portion of the main cylinder and the inner end portion of the outer cylinder forming a gap having a tapered profile and extending over an entire circumference, each of the locking balls being stored in the gap and movable between a position in which the ball projects radially inward from the inner peripheral surface of the main cylinder and a position in which the ball is recessed from the inner peripheral surface and a thrust cylinder slidably located in the space between the main cylinder and the outer cylinder and urged toward the end portion, the plug being adapted to be prevented from separating from the socket in a manner such that centrifugal movement of the locking balls is prevented by means of the thrust cylinder when the locking balls are situated in the projected position and in engagement with the locking portion of the plug.

* * * * *